United States Patent
Sun (10) Patent No.: US 7,756,399 B2
(45) Date of Patent: Jul. 13, 2010

(54) SAFE RECOVERY IN DVD RECORDABLE/REWRITABLE REALTIME RECORDING

(75) Inventor: Lu Yi Sun, Shanghai (CN)

(73) Assignee: LSI Corporation, Milpitas, CA (US)

( * ) Notice: Subject to any disclaimer, the term of this patent is extended or adjusted under 35 U.S.C. 154(b) by 1014 days.

(21) Appl. No.: 11/187,362

(22) Filed: Jul. 22, 2005

(65) Prior Publication Data

US 2007/0036043 A1    Feb. 15, 2007

(51) Int. Cl.
*H04N 7/64* (2006.01)
*H04N 5/91* (2006.01)
*H04N 7/00* (2006.01)
*H04N 7/26* (2006.01)
*H04N 5/00* (2006.01)

(52) U.S. Cl. .............. 386/113; 386/46; 386/95; 386/124; 386/125; 386/126

(58) Field of Classification Search .............. 386/100, 386/113, 1, 46, 52, 68, 95, 124–126
See application file for complete search history.

(56) References Cited

U.S. PATENT DOCUMENTS

| | | | |
|---|---|---|---|
| 6,631,104 B2 | 10/2003 | Kuroda et al. | 369/47.28 |
| 6,862,401 B1 * | 3/2005 | Higashida et al. | 386/100 |
| 7,017,078 B2 * | 3/2006 | Frimout | 714/20 |
| 7,134,039 B2 * | 11/2006 | Wang | 714/2 |
| 7,155,448 B2 * | 12/2006 | Winter | 707/101 |
| 2002/0025138 A1 * | 2/2002 | Isobe et al. | 386/95 |
| 2004/0136693 A1 * | 7/2004 | Iwasaki et al. | 386/95 |

OTHER PUBLICATIONS

"DVD Recorder DVR-510H Operating Instructions", 2003, pp. 1-115.

* cited by examiner

*Primary Examiner*—Marsha D Banks Harold
*Assistant Examiner*—Marc Dazenski
(74) *Attorney, Agent, or Firm*—Christopher P. Maiorana, PC (57) ABSTRACT

An apparatus comprising an encoder, a packet generator, a disc loader, and a rebuild circuit. The encoder may be configured to generate a format data stream in response to an input signal. The packet generator may be configured to generate special packets from extracts of the format data stream. The disc loader may be configured to write the special packets on a disc. The rebuild circuit may be configured to (i) rebuild one or more navigation files and a file system with the special packets and (ii) write the one or more navigation files and the file system to the disc.

20 Claims, 4 Drawing Sheets

SAFE RECOVERY IN DVD RECORDABLE/REWRITABLE REALTIME RECORDING

FIELD OF THE INVENTION

The present invention relates to optical storage devices generally and, more particularly, to a method and/or apparatus for safe recovery in DVD recordable/rewritable realtime recording.

BACKGROUND OF THE INVENTION

The recording process for conventional DVD recorders may take 6 or more hours before the recording process is completed. During the recording process, typical DVD recorders (e.g., SONY RDR GX7, Philips DVR 890, 985, etc.) only write video, audio and/or navigation data to the disc. For normal recording, the DVD recorder receives audio/video from a tuner. The audio/video is encoded into an MPEG2 DVD format data stream and stored into memory. The DVD format data stream is recorded onto a DVD disc (e.g., a DVD+RW/+R disc). The encoding of DVD format data and the recording of DVD format data on the DVD disc are executed at the same time until recording is complete. When the DVD recorder stops recording, the DVD recorder will begin to generate a menu and write the navigation files and the file system to disc. The DVD disc can be played on a DVD player or on a personal computer (PC) after the navigation files and the file system is loaded to the DVD disc. If there is a system failure or a system crash while encoding DVD format data or recording the DVD format data to the DVD disc, the recorded data on the DVD disc cannot be viewed. Conventional DVD players do not write file systems and DVD navigation files to disc during system failure.

A system failure may occur when there is a power failure (e.g., a heavy voltage fluctuation, or the power is unplugged) or a system crash (e.g., the quality of DVD RW/R disc is low or a disc loader fails at high temperature). The next time the DVD recorder is turned on, the disc cannot be successfully read. The data recorded during the recording process will be lost and the disc will be seen by a player as an empty disc (DVD-RW) or a bad disc (DVD-R). To recover lost data, the consumer will have to take the disc to a technician in order to extract the data from the bad disc. It is difficult for consumers to retrieve lost data on discs without help from a technician.

It would be desirable to provide a method and/or apparatus to implement a safe recovery in DVD recordable/rewritable realtime recording in a manner suited for low cost, low power, and/or real time devices.

SUMMARY OF THE INVENTION

The present invention concerns an apparatus comprising an encoder, a packet generator, a disc loader, and a rebuild circuit. The encoder may be configured to generate a format data stream in response to an input signal. The packet generator may be configured to generate special packets from extracts of the format data stream. The disc loader may be configured to write the special packets on a disc. The rebuild circuit may be configured to (i) rebuild one or more navigation files and a file system with the special packets and (ii) write the one or more navigation files and the file system to the disc.

The objects, features and advantages of the present invention may include (i) preventing recorded data from being lost during a power failure or system crash, (ii) allowing data to be automatically recovered when restarting the DVD recorder, (iii) providing a short wait time to recover lost data, (iv) determining whether the last title recorded was recorded by a normal method, or a safe recovery method, (v) eliminating concerns that data may be lost when recording data for a long period of time and/or (vii) providing a safe recovery that is reliable and does not depend on whether a file system exists on the disc.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

Figure 1:
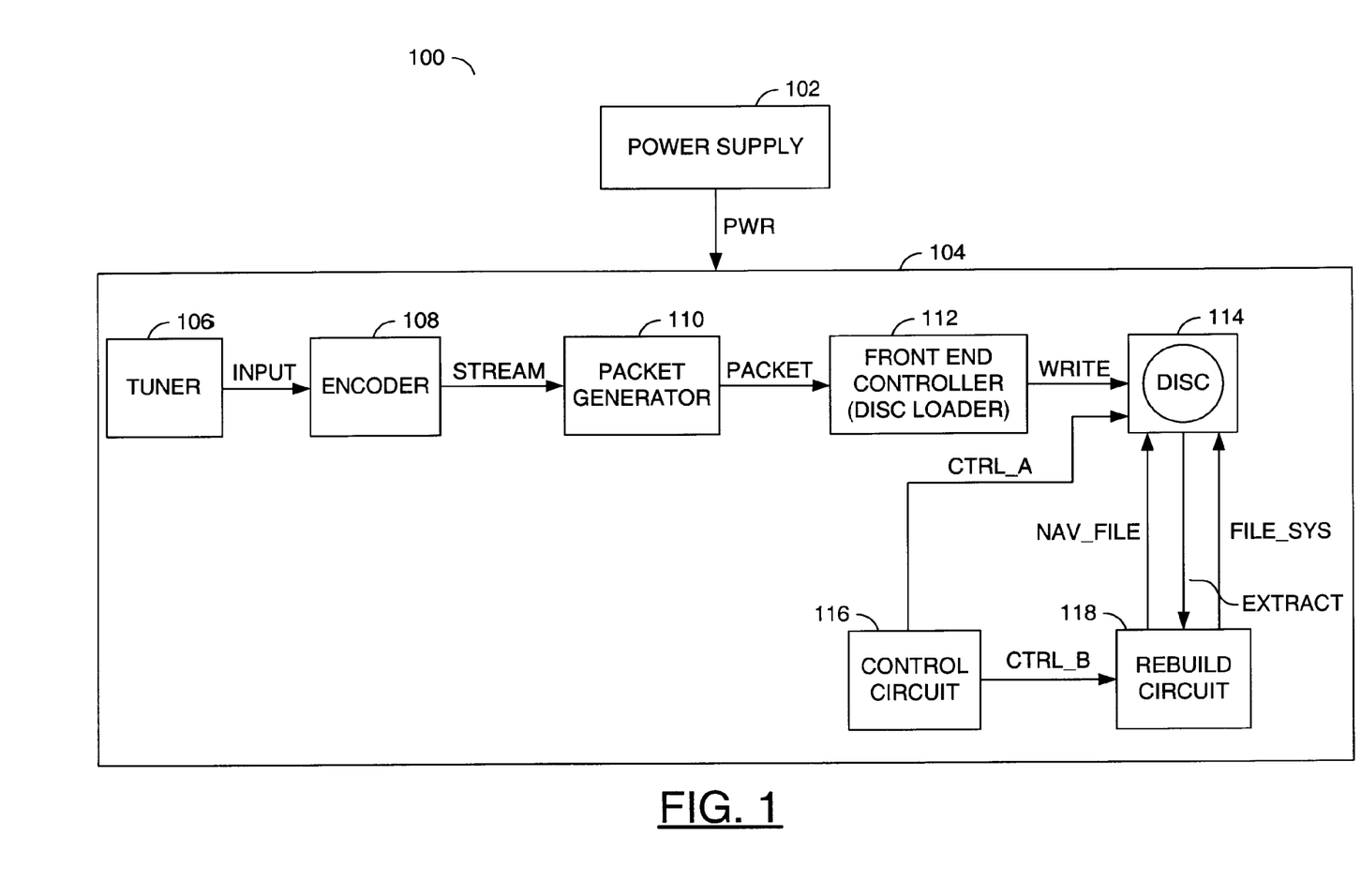
FIG. 1 is a block diagram of a preferred embodiment of the present invention.

Referring to FIG. 1, a block diagram of a system 100 is shown in accordance with a preferred embodiment of the present invention. The system generally comprises a block (or circuit) 102 and a block (or circuit) 104. The block 102 may be implemented as a video recorder. The power supply may provide a signal (e.g., PWR) to the video recorder 104.

The video recorder 104 generally comprises a block (or circuit) 106, a block (or circuit) 108, a block (or circuit) 110, a block (or circuit) 112, a block (or circuit) 114, a block (or circuit) 116 and a block (or circuit) 118. The block 106 may be implemented as a tuner. The block 108 may be implemented as an encoder. The block 110 may be implemented as a packet generator. The block 112 may be implemented as a front end controller (or disc loader). The block 114 may be implemented as a disc. The block 116 may be implemented as a control circuit. The block 118 may be implemented as a rebuild circuit.

The tuner 106 may present audio/video data on a signal (e.g., INPUT) to the encoder 108. The encoder 108 may present a format data stream on a signal (e.g., STREAM) to the packet generator 110. The packet generator 110 may present special packets on a signal (e.g., PACKET) to the disc loader 112. The special packets generally comprise DVD format data extracts. The disc loader 112 may write the special packets on a signal (e.g., WRITE) to the disc 114. The disc 114 may present a signal (e.g., EXTRACT) to the rebuild circuit. The rebuild circuit 118 may present navigation files on a signal (e.g., NAV_FILE) to the disc 114. The write circuit 118 may present a file system over a signal (e.g., FILE_SYS) to the disc 114. The control circuit 116 may present a signal (e.g., CTRL) to the write circuit 118.

In general, the present invention may use special packets to restore recorded video when the video recorder 104 fails to record an entire (or desired video) to the disc 114 (e.g., DVD+RW/+W disc). The recording process generally includes (i) encoding DVD format data with the encoder 108 (ii) generating special packets of data from DVD format data extracts with the packet generator 110, and (iii) writing the special packets to the disc 114. In general, the system 100 may use the special packets for "safe recovery" of recorded data stored to the disc 114 if the original recording of video to the disc 114 is interrupted. The special packets may be implemented as a kernel for the safe recovery of the recorded data on the disc 114.

During the recording process, the special packets may be recorded to the disc 114. If the system 100 encounters a system failure while recording the special packets to the disc 114, the system 100 may search for the special packets on the disc 114 when the system reboots. The control circuit 116 may control the disc 114 to search for the special packets on the signal CTRL_A. The disc 114 may present the special packets on the signal EXTRACT to the rebuild circuit 118. The rebuild circuit 118 may rebuild navigation files and a file system with the DVD format extracts in the special packets. The rebuild circuit 118 may write the restored file system to the disc 114 over the signal FILE_SYSTEM in response to receiving the signal CTRL_B. The rebuild circuit 118 may write the navigation files to the disc 114 over the signal NAV_FILE in response to receiving the signal CTRL_B.

It is generally believed that recording streams on the DVD disc are generally full. However, this is actually not the case. The present invention uses unused/reserved parts in the recording streams on the DVD disc 114 to store the special packets. In general, the recorded stream comprises a number of video object units (VOBUs). Each VOBU comprises a navigation pack, a number of video (MPEG) packs, a number of audio packs and a number of subpicture packs (e.g., the subpicture packets may be optional). Each VOBU is generally a term specified DVD-VIDEO spec. The VOBU is a minimal unit of recording. The VOBU may have a typical length of 0.5 seconds. The VOBU generally comprises 15 frames for the NTSC standard. Each VOBU may have only one navigation pack, and more than one video and audio pack. Each pack may be a logical sector of data. A packet may be part of the pack and is generally smaller than the pack. Each navigation pack may be a logical sector (e.g., with a storage size of 2048 bytes). The navigation pack is generally the first pack of the VOBU.

The navigation pack generally comprises a presentation control information (PCI) packet and a data search information (DSI) packet. The DSI packet generally includes a reserved area of data storage. The size of the data storage may be 471 bytes. The data storage in the DSI packet is generally not used by the navigation pack in any known revisions of DVD-Video and DVD+RW specifications. The present invention may use free data storage in the navigation pack to store the special packets. In one example, the special packets may be stored in the DSI packet in each navigation pack.

In general, the difference between safe recovery and normal recording is that in the normal recording process, the system 100 builds navigation files by real-time recording data which resides in memory (not shown). With the safe recovery, the system 100 extracts real time recording data from the data (e.g., special packets) on the disc 114. The system 100 builds navigation files with the extracted real time data. With the normal recording process, real time data in dynamic memory is generally lost after a recording failure and when the system restarts.

The system 100 may include a position search program. The position search program generally determines the position of the disc 114 when the recording process was interrupted. The position search program is simple but a smart part of the safe recovery. The position search program may be implemented differently between DVD+RW discs and DVD+R discs. For DVD+RW discs, the disc loader 112 may not report a last write address, because the DVD+RW disc is random accessible media. Therefore, determining where the last record (write) stops may not be possible. Therefore, searching the DVD+RW disc for the last recorded data stream may be needed. In general, a used DVD+RW disc may have a number of unorganized data which remains on the disc. Each special packet generally includes a unique id. A unique id may be created for each recording session. The system 100 may use a CRC (cyclic redundant check) program to ensure the special packet is correct. The unique id may be added into a record flag. The present invention may (i) search the disc 114, (ii) find the special packet and (iii) match the unique id with the unique id stored in the record flag.

The present invention may also implement a binary search idea (or "bisearch"). Generally, a search for position on the disc 114 is very time consuming (e.g., from the beginning to the end). In one example, a 4.7G disc may need more than 10 minutes for a brutal search with an average speed disc loader. The bisearch generally defines a start position and an end position in the search, and each time, the middle position is tested to determine if the middle position is acceptable. If the middle position is acceptable, the bisearch may choose to search the left side or the right side of the middle position. The bisearch may then decide to test another middle position.

The bisearch may select a start position at the beginning of the first possible recording address (e.g., in the Philips specification, the first possible recording address is 0x4000). The bisearch may select an end position at the end of disc 114 (e.g., about 4.6G). The bisearch may take less than 5-10 seconds to find where the last recording had stopped (e.g., the last write position). Generally, each special packet includes information related to the last recording position. The last recording position may be used to provide the start position to resume recording (e.g., last recording start position). Therefore, there is enough position information known about the last recording.

For DVD+R discs, a position search program may be different from the bisearch program implemented for DVD+RW. Since the DVD+R disc is a sequential write media, the disc loader 112 may report the last write address. Therefore, since the last write position of recorded data on the disc 114 may be immediately ascertained. From the last write position, the special packet may be read and to possibly obtain the last record start position immediately.

The system 100 may rescue or retrieve data once a system a failure has been detected and after the disc recorder 104 restarts. The disc recorder 104 generally includes a watchdog timer (not shown). The watchdog timer may check the status of the main recording task. If the recording task is not proper (e.g., a system crash or the system 100 halts unexpectedly), the watchdog timer may restart the disc recorder 104. The safe recovery may work along with the watchdog timer. The system failure may be caused by a loss of power. Since the system 100 generally has no power, the watchdog timer cannot restart disc recorder 104. Therefore, the disc recorder 104 may have to wait for power to be reapplied. If power is reapplied to the disc recorder 104, the system 100 may switch on and continue with safe recovery. The system 100 may switch on and continue with safe recovery in the timer record mode.

The system 100 generally identifies a recording error before the system restarts, which may help enable safe recovery. The system 100 generally implements a record flag. The record flag generally comprises a data pack. In general, the present invention stores the data pack (e.g., a small portion of data) on the disc 114 which is not being used by any other application to act as the record flag. The data pack generally includes a flag which indicates if the last recording is complete and successful. If the last recording starts, a flag is set to 1, if the last recording is complete and successful, the flag is cleared to 0, else the flag remains set to 1. In general, the present invention may check the flag to determine if the last recording is complete and successful. The record flag for a DVD+RW disc may be stored (or hidden) in the unused area of storage after navigation files are stored, but before the recording streams are stored. The data pack generally comprises 2048 bytes of data. For a DVD+R disc, the record flag may be added to the data at the address before the beginning of where the recording stream starts.

In general, navigation files are basically index information about the recording stream. The navigation files generally stores title, a chapter, a logical connection of cells (e.g., playlist). The title may have one or more chapters. Each cell may comprise a group of VOBUs. Each VOBU may be defined as a minimal recording stream unit. The cell and VOBU may be entities in the DVD recording streams. The title and chapter are generally the "playlist" to connect the cell and VOBU. Therefore, if the cell and VOBU information are known, the cell index and the VOBU index may be built. The present invention may easily build the title and the chapter information. For example, if the recording start and stop position is known, and since the number of cells is known, the tile and chapter information may be built. The number of cells may be combined to form one chapter. In general, the special packets for one recording have something in common. The basic TAG (or unique id) of the last record.

Generally, each special packet includes corresponding VOBU information for which the special packet belongs. The VOBU information generally includes a VOBU start address and a VOBU end address. Each VOBU includes corresponding cell information for which each VOBU belongs to. The cell information generally comprises a cell id, a cell start address and a cell end address. Each special packet may have information related to the position of the previous special packet. Therefore, the present invention may start from the last special packet in the last recording end position, and search back to get all of the information in the preceding special packets. The present invention may then obtain and use the information in the special packets to build the navigation file. The filesystem is generally built with information from the navigation file and recording stream file. Since the navigation files and the recording stream position and length may be built with the special packets, the filesystem may be easily constructed.

In general, auto chapter time is additional information which may be used to recover recorded video on the disc 114. The chapter time division is not necessarily specified in DVD-Video specification. However, cell information is fundamental information and is disclosed in the DVD-Video specification. One chapter may have one or more cells. With conventional systems, the chapter information may be generated after recording stops. Prior to the recording stopping, the chapter information may not be written on disc 114. Instead, the chapter information stays in memory. The chapter information is generally not in the DVD realtime recording streams. The chapter time is only stored in the navigation file. Typically, the navigation files are generated after real-time recording stops. With conventional systems, if there is a recording failure, and the auto chapter information is not stored, the auto chapter information may be lost after safe recovery. The present invention adds the auto chapter marker information as part of the special packet. Therefore, the chapter information will not be lost during the recording failure and after the safe recovery.

Figure 2:
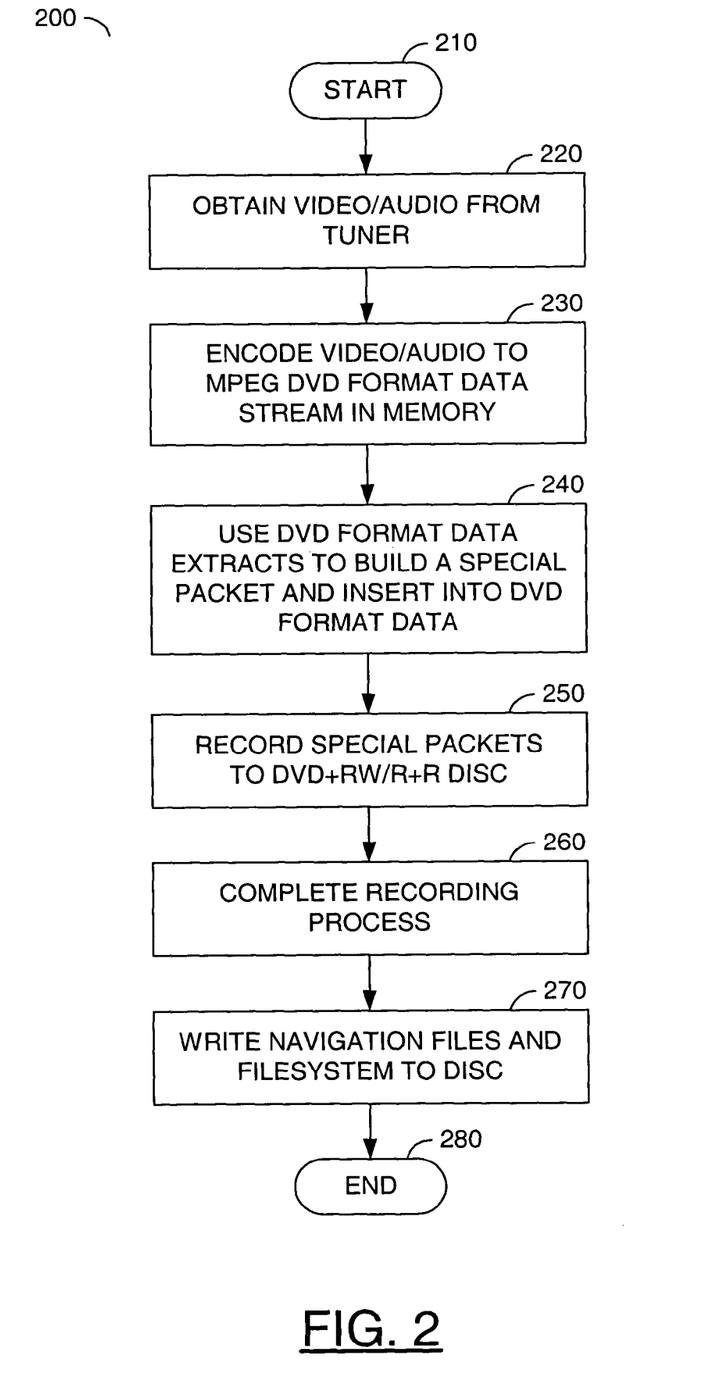
FIG. 2 is a diagram of a process for recording data with a safe recovery implementation.

Referring to FIG. 2, a method 200 is shown which illustrates recording data on a disc with a safe recovery implementation. The method 200 generally comprises a state (or step) 210, a state (or step) 220, a state (or step) 230, a state (or step) 240, a state (or step) 250, a state (or step) 260, a state (or step) 270 and a state (or step) 280. The state 210 generally obtains video/audio from a tuner (or other sources, such as a digital video (DV)). The state 220 generally encodes video/audio to an MPEG2 DVD format data stream in memory. The state 240 generally uses extracts from the DVD format data to build special packets. The special packets may be reinserted into the DVD format data. The state 250 generally records the DVD format data with the special packets to a DVD+RW/+R disc. The state 260 generally completes the recording process. The recording of the special packets may take several hours, depending on the recording quality. The typical recording time may be 2 hours for standard quality. After the recording process is complete, the state 270 generally writes navigation files and the filesystem to the disc. The method 200 is generally performed when a recording error has not occurred.

Figure 3:
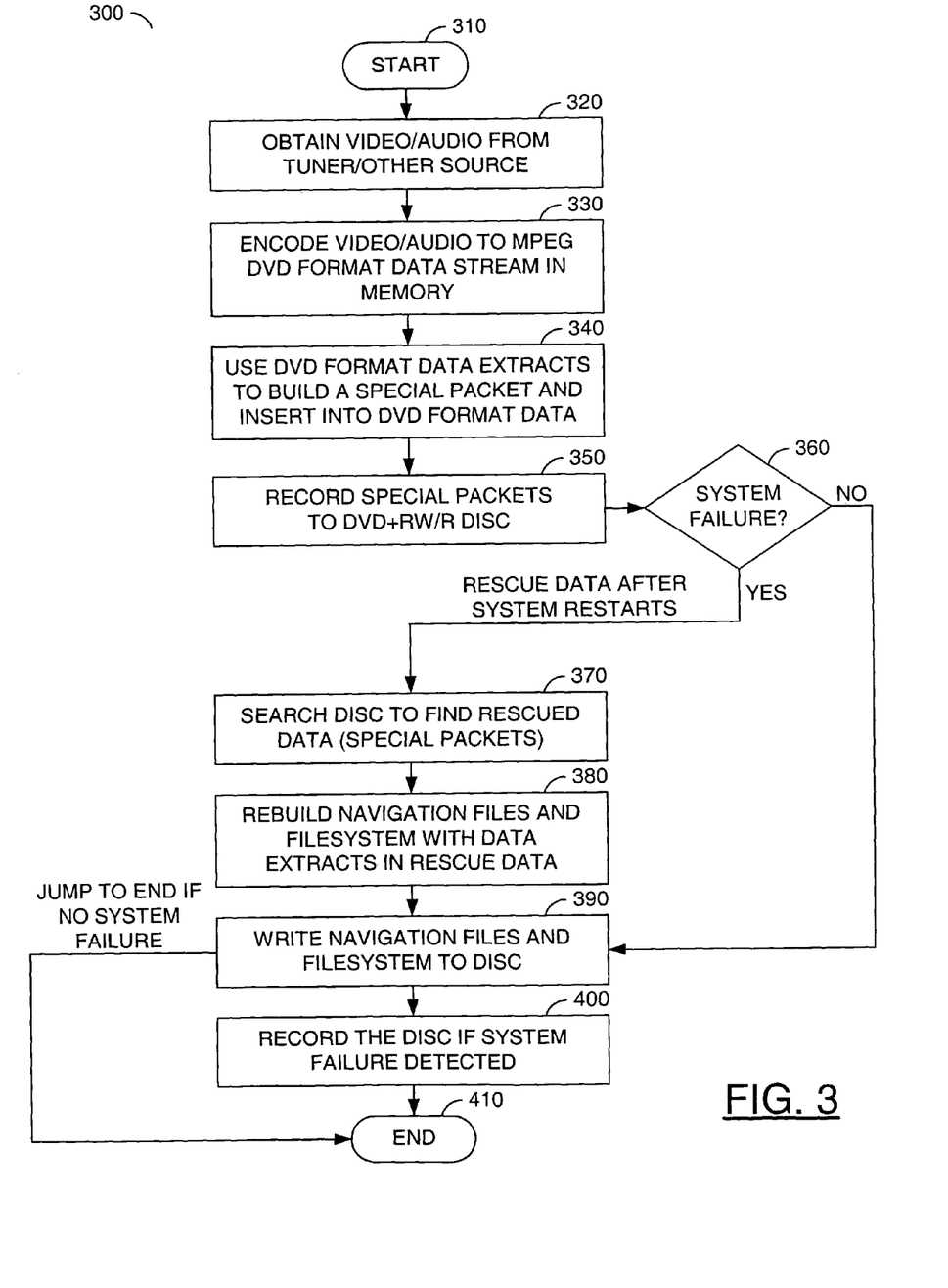
FIG. 3 is a diagram of a process implementing rescue steps with the safe recovery implementation.

Referring to FIG. 3, a method 300 is shown which illustrates executing the safe recovery on a DVD recorder. The method 300 generally comprises a state (or step) 320, a state (or step) 330, a state (or step) 340, a state (or step) 350, a decision state 360, a state (or step) 370, a state or step) 380, a state (or step) 390, a state (or step) 400 and a state (or step) 410. The method 300 may be used to rescue data if the DVD recorder has a system crash or a power failure while recording data on a disc.

The step 320 generally obtains video/audio from the tuner (or other sources such as a DV). The state 330 generally encodes video/audio to an MPEG2 DVD format data stream in memory. The state 340 generally uses the DVD format to extract data to build special packets and to insert the special packets into the DVD format data. The state 350 generally records the special packets (e.g., the DVD format data) to a DVD+RW/+R disc. In general, the method 300 may be used to rescue or retrieve data once a system failure has been detected when the disc recorder restarts. The decision state 360 generally determines if a system failure has been detected. The system failure may be in the form of a power failure or a system crash. If a system failure has been detected, the method 300 moves to the state 370. The state 370 generally searches the disc to (i) find the special packets on the disc and (ii) determine where the recording process had stopped (e.g., the position on disc when the system failure had occurred). The state 380 generally rebuilds the navigation files and the filesystem with the special packets. The state 390 generally writes the navigation files and the filesystem to the disc. The state 400 generally reloads the disc if a system failure was detected.

For a conventional disc recorder, loss in power may result in the disc recorder (i) losing previously recorded video and (ii) discontinuing the recording of programmed video. While the disc recorder may restart recording, the important information files are not saved and the contents of the previously recorded data may be lost. With a disc recorder implementing the present invention, after power is re-applied, the method 300 generally rescues the previously recorded data, and continues to record the rest of the program. The method 300 uses the special packets to rebuild the navigation files and the filesystem to rescue previously recorded data and continue recording the rest of the program.

Figure 4:
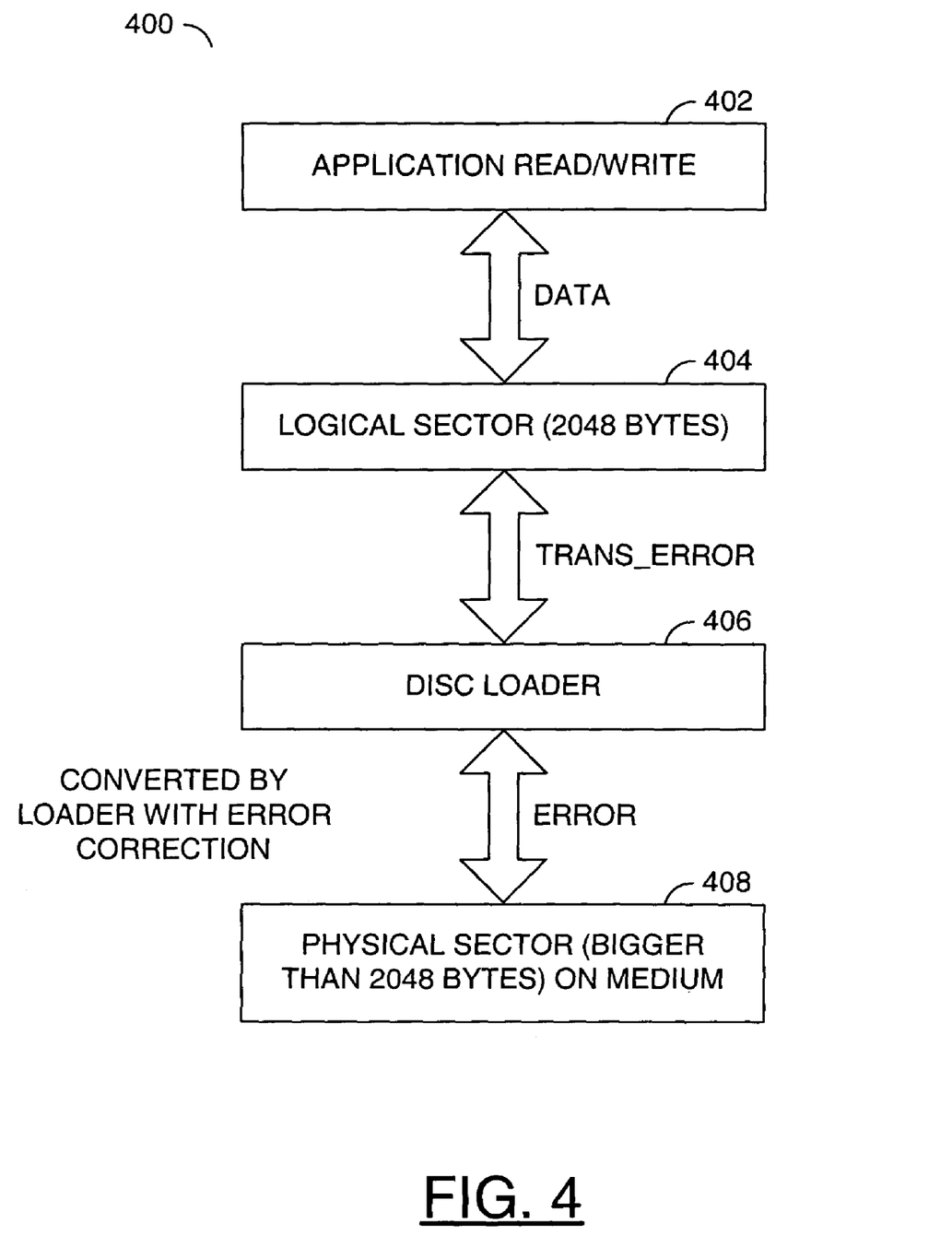
FIG. 4 is a block diagram of a system which implements a media defect recovery system.

Referring to FIG. 4, a block diagram of a system 400 is shown which implements a media defect recovery system. The system 400 generally comprises a block (or circuit) 402, a block (or circuit) 404, a block (or circuit) 406 and a block (or circuit) 408. The circuit 402 may be implemented as an application read/write circuit. The circuit 404 may be implemented as a logical sector. The circuit 406 may be implemented as a disc loader. The circuit 408 may be implemented as a physical sector.

The application read/write block 402 may present/receive a signal (e.g., DATA) to/from the logical sector 404. The logical sector 404 may present/receive a signal (e.g., TRANS_ERROR) to/from the disc loader 406. The physical sector 408 may present/receive a signal (e.g., ERROR) to/from the disc loader 406. In general, the logical sector 404 may store 2048 bytes. The application read/write block 402 may read data stored on the logical sector 404. The application read/write block 402 may write data to the logical sector 404. The physical sector 408 generally stores more data than the logical sector 404. In general, the physical sector 108 may be implemented with a number of bytes that may be greater than 2048 bytes. The physical sector 108 generally comprises error correction information. In one example, during a READ cycle, the disc loader 406 may receive error correction information over the signal ERROR_CORRECTION. The disc loader 406 may (i) translate the error correction information and/or (ii) transmit the translated error correction information on the signal TRANS_ERROR to the logical sector 404.

The logical sector is a term in DVD-Video specification and DVD technology. Each logical sector is 2048 bytes. The logical sector 404 is the minimal unit that can be accessed on a DVD (including DVD+R/+RW/-R/-RW/-RAM). The physical sector is also a term used with DVD technology. To store data with an error correction mechanism, each logical sector is stored in more than 2048 bytes on the DVD media. The size of physical sector for DVD+RW/+R is 2352 bytes. Redundant data is generally used as a ECC (ERROR CORRECTION CODE) for error correction of the 2048 bytes of logical sector 404. In general, the physical sector=logical sector+ECC. The physical sector 408 is generally only accessible inside the disc loader 406 (DVD drive). When reading/writing to the disc DVD, the logical sector 404 is being read or is being written to the physical sector 408. The ECC on the logical sector 404 ensures the sector data which exists on media (e.g., disc) is acceptable to read or write. However, the ECC may not ensure that all of the real time recording data has been completely written on the disc. The system 100 generally has no relation with the physical sector 408. The disc loader is normally considered the DVD drive (Front End) that can read/write DVD recordable/rewritable discs. The system 400 is generally configured to recover recorded data due to media defects. Other procedures may be used to recover errors from bad disc media. However, the present invention may be used to restore data when recording failure occurs due to a system failure with good media. Generally, in most cases, a power loss or system crash will not damage the disc media, but cause data loss. Data loss occurs when data may not have been updated or completely written to the disc, but the disc media is still functional.

The present invention may restore recorded data lost during a system failure or power failure. The present invention may rebuild/create navigation files from recording streams. The present invention may also ensure that all real time recording data is stored on the disc 114.

The present invention may be useful in real-time recording for optical discs because (i) optical discs have limited access speed and (ii) the filesystem for optical discs cannot be updated dynamically. In general, the present invention may not be needed for non real-time recording or for HDD (hard-disk drives) because harddisk drives (HDD) are very fast and the index/filesystem can be built and updated dynamically.

The present invention is generally safe and may rapidly recover an almost fully recorded disc which failed during the recording process. In one example, for SLP mode on a 4.7G DVD RW/R to record data, it may take up to 6 hours before the recording operation is complete. If the recording process fails before the last file system generation process is complete, all of the data recorded within the 6 hours may be lost. However, with the present invention, only 3-4 seconds of data at the end of recording may be lost. The 3-4 seconds of lost data may be located in the disc loader cache. If the lost data is still located in the disc loader, then the data may not have been written to disc. In general, data may be retrieved from the disc in less than 2 minutes. A faster disc loader may reduce the recovery time to less than 1 minute.

The present invention may maintain a recorded data length which is essentially identical to systems that do not implement a recovery process for retrieving data on a disc. While the present invention implements a safe recovery which writes special packets of data to the disc, the present invention generally does not occupy more space than the space occupied on a disc during a normal recording process.

The present invention may be implemented without depending on a specific disc loader. Any Multimedia Command Console (MMC) compatible disc loader may be implemented with the present invention. In general, an ATAPI is an interface for a host to communicate with DVD/CD driver (e.g., the disc loader). MMC are commands used by the ATAPI. The present invention is generally not dependent on a specific DVD RW/R disc. A disc that is compliant with any DVD RW/R specification may be used. With the present invention, it is not normally necessary for the disc loader to (i) obtain a special position when stream writing and (ii) interrupt the normal recording procedure.

The present invention may be implemented without storing data on non-volitle random access memory (NVRAM). The NVRAM generally includes FLASH or EEPROM. External NVRAM is usually slower then dynamic random access memory (e.g., dynamic memory) However, the data stored on NVRAM may not be lost, even when power is lost. Accessing external memory may add more time and system load. Also, the implementation of an external NVRAM may increase cost. Also, by frequently accessing external memory to store data memory life may be reduced. Alternative ways to use the present invention may include (i) software of DVD RW/R realtime recording on a PC, (ii) DVD-RW VR mode realtime recording, and (iii) optical storage monitoring systems.

The DVD-RW VR mode is a technical specification related to real-time recording. The DVD_RW VR specification is different than the DVD+RW specification which belongs to Philips. The DVD-RW VR spec is maintained by the DVD Forum. The owner of this specification is Pioneer, Panasonic, Toshiba and a few other Japan Companies. The DVD-RW VR format is generally not compatible with DVD-Video format. The DVD+RW format (by Philips) is compatible with DVD-Video specification and occupies a larger market share than DVD-RW VR (DVD Forum). The present invention may be based on the DVD+RW specification and the DVD-Video specification. The present invention has not been optimized for use with DVD-RW VR. However, some of the concepts disclosed may use DVD-RW VR format with appropriate modifications.

The present invention may provide advantages over conventional solutions. The present invention may provide an ultimate solution that may be applicable to next generations of optical drives. The present invention may allow a simple implementation. The present invention may provide a solution that is sensitive and reliable with high resolution and low cost.

The function performed by the flow diagram of FIGS. 2-3 may be implemented in hardware, software (firmware) or a combination of hardware and software. The present invention may be implemented using a conventional general purpose digital computer programmed according to the teachings of the present specification, as will be apparent to those skilled in the relevant art(s) Appropriate software coding can readily be prepared by skilled programmers based on the teachings of the present disclosure, as will also be apparent to those skilled in the relevant art(s).

The present invention may also be implemented by the preparation of ASICs, FPGAs, or by interconnecting an appropriate network of conventional component circuits, as is described herein, modifications of which will be readily apparent to those skilled in the art(s).

The present invention thus may also include a computer product which may be a storage medium including instructions which can be used to program a computer to perform a process in accordance with the present invention. The storage medium can include, but is not limited to, any type of disk including floppy disk, optical disk, CD-ROM, magneto-optical disks, ROMs, RAMs, EPROMs, EEPROMs, Flash memory, magnetic or optical cards, or any type of media suitable for storing electronic instructions.

The present invention may be applied for all kind of CD optical discs (e.g., CD-ROM, CD-R, CD-RW, etc.) as well as DVD-ROM, DVD-R, DVD-RW, DVD+R, DVD+RW. The present invention may also be applicable to next generation optical discs (e.g., Blue-Ray discs and HD-DVD).

While the invention has been particularly shown and described with reference to the preferred embodiments thereof, it will be understood by those skilled in the art that various changes in form and details may be made without departing from the spirit and scope of the invention.

The invention claimed is:

1. An apparatus comprising:
   an encoder configured to generate a format encoded data stream in response to an input signal, wherein said format encoded data stream (i) has a first size, and (ii) comprises a plurality of recording units each having a uniform size;
   a packet generator configured to (i) generate special packets from extracts of said format encoded data stream, and (ii) reinsert said special packets into said recording units of said format encoded data stream in a previously unused portion of said recording units, wherein (a) said recording units retain said uniform size within said format encoded data stream after said special packets are reinserted, and (b) the reinsertion of said special packets does not increase said first size of said format encoded data stream;
   a disc loader configured to write said format encoded data stream with said special packets on a disc, wherein said special packets are contained within said recording units; and
   a rebuild circuit configured to (i) rebuild one or more navigation files and a file system with said special packets and (ii) write said one or more navigation files and said file system to said disc, wherein writing said format encoded data stream with said special packets contained within said format encoded data stream, said navigation files and said file system occupies the same space on said disc as a conventional system recording said format encoded data stream, said navigation files, and said file system.

2. The apparatus according to claim 1, wherein said special packets are written into reserved portions in said recording units of said format encoded data stream on said disc.

3. The apparatus according to claim 2, wherein said special packets are written into a data search information (DST) packet.

4. The apparatus according to claim 1, wherein said apparatus further comprises:
   a basic search program configured to determine the position of a DVD+RW disc when a recording process is interrupted.

5. The apparatus according to claim 4, wherein said special packet further comprises information regarding the last recording start position.

6. The apparatus according to claim 5, wherein said disc loader provides a last write address.

7. The apparatus according to claim 6, wherein said last write address is the last known position of recorded data on a DVD+R disc.

8. The apparatus according to claim 1, wherein said apparatus further comprises:
   a record flag configured to indicate whether a recording error occurred during a recording process.

9. The apparatus according to claim 8, wherein said record flag comprises a data pack stored in an unused area of storage on a DVD+RW disc.

10. The apparatus according to claim 1, wherein said special packets includes information related to the position of a previous special packet.

11. The apparatus according to claim 1, wherein said special packets provides auto chapter marker information.

12. The apparatus according to claim 1, wherein each of said special packets comprise a unique id.

13. The apparatus according to claim 1, wherein said one or more navigation files are built with extracted real time data.

14. The apparatus according to claim 13, wherein said filesystem is built with information by said one or more navigation files and a recording stream file.

15. A method for safe recovery of recorded video, said method comprising the steps of:
   (a) generating a format encoded data stream, wherein said format encoded data stream (i) has a first size, and (ii) comprises a plurality of recording units each having a uniform size;
   (b) generating special packets from extracts of said format encoded data stream;
   (c) reinserting said special packets into said recording units of said format encoded data stream in a previously unused portion of said recording units, wherein (a) said recording units retain said uniform size within said format encoded data stream after said special packets are reinserted, and. (b) the reinsertion of said special packets does not increase said first size of said format encoded data stream;
   (d) writing said format encoded data stream with said special packets to a disc, wherein said special packets are contained within said recording units;
   (e) rebuilding one or more navigation files and a file system with said special packets; and
   (f) writing said one or more navigation files and said file system to said disc, wherein writing said format encoded data stream with said special packets contained within said format encoded data stream, said navigation files and said file system occupies the same space on said disc as a conventional system recording said format encoded data stream, said navigation files, and said file system.

16. The method according to claim 15, wherein step (d) further comprises the step of:
    searching for said special packets on said disc if a system error has occurred.

17. The method according to claim 15, wherein step (d) further comprises the step of:
    writing said special packets into a data search information (DSI) packet.

18. The method according to claim 15, further comprising the step of:
    indicating whether a recording error occurred during a recording process.

19. The method according to claim 15, wherein step (e) further comprises the step of:
    rebuilding said one or more navigation files with extracted real time data.

20. An apparatus comprising:
    means for generating a format encoded data stream, wherein said format encoded data stream (i) has a first size, and (ii) comprises a plurality of recording units each having a uniform size;
    means for generating special packets from extracts of said format encoded data;
    means for reinserting said special packets into said recording units of said format encoded data stream in a previously unused portion of said recording units, wherein (a) said recording units retain said uniform size within said format encoded data stream after said special packets are reinserted, and (b) the reinsertion of said special packets does not increase said first size of said format encoded data stream;
    means for writing said format encoded data stream with said special packets to a disc, wherein said special packets are contained within said recording units;
    means for rebuilding one or more navigation files and a file system with said special packets; and
    means for writing said one or more navigation files and said file system to said disc, wherein writing said format encoded data stream with said special packets contained within said format encoded data stream, said navigation files and said file system occupies the same space on said disc as a conventional system recording said format encoded data stream, said navigation files, and said file system.

* * * * *